United States Patent [19]

Rögner et al.

[11] 4,350,011
[45] Sep. 21, 1982

[54] PUMPING APPARATUS FOR FLUID

[75] Inventors: Thomas Rögner, Kirchberg; Anton Frank, Oberspeltach, both of Fed. Rep. of Germany

[73] Assignee: Voith Turbo GmbH & Co. KG, Crailsheim, Fed. Rep. of Germany

[21] Appl. No.: 144,881

[22] Filed: Apr. 29, 1980

[30] Foreign Application Priority Data

May 7, 1979 [DE] Fed. Rep. of Germany ....... 2918284

[51] Int. Cl.³ .............................................. F16D 33/08
[52] U.S. Cl. ........................................ 60/337; 60/358; 415/90
[58] Field of Search ....................... 415/88, 90; 60/336, 60/337, 357, 358, 330

[56] References Cited

U.S. PATENT DOCUMENTS

| | | | |
|---|---|---|---|
| 1,975,505 | 10/1934 | Fottinger | 60/357 |
| 2,843,047 | 7/1958 | Korber | 415/90 |
| 3,237,408 | 3/1966 | Bunnelle et al. | 60/358 |
| 3,733,144 | 5/1973 | Gardner | 415/90 |

Primary Examiner—Carlton R. Croyle
Assistant Examiner—Jeffrey A. Simenauer
Attorney, Agent, or Firm—Ostrolenk, Faber, Gerb & Soffen

[57] ABSTRACT

The disclosure concerns a pumping apparatus for working fluid, in a hydrodynamic coupling, or the like. Working fluid is stored in a sump and is to be lifted by a spinning disc to an elevated container from which the working fluid is then directed back into the spinning disc. The periphery of the spinning disc picks up the working fluid from the sump and carries it around to spary it up toward a deflector at the top of the housing which deflects the fluid into the container. A groove-like duct encloses the lower quarter of the disc for directing the fluid back toward the surface of the disc. The disc has a trapezoidal cross-section peripheral groove for further carrying the fluid beyond the top exit of the duct so that the fluid may be thrown toward the deflector at the top of the housing.

26 Claims, 2 Drawing Figures

PUMPING APPARATUS FOR FLUID

BACKGROUND OF THE INVENTION

The invention is concerned with apparatus for pumping fluid, such as the working fluid of a hydrodynamic adjustment coupling, and particularly pumping apparatus used for conducting fluid from the lower part of a machine housing (the sump) in which the fluid has collected into a container at a higher level.

The apparatus according to the present invention comprises a spinning disc which dips into the sump, and which has an axis of rotation that is sustantially horizontally. The spinning disc co-acts with a stationary supply duct disposed in the machine housing. The duct encloses at least approximately a quarter of the circumference of the spinning disc from the deepest point up to the vicinity of the horizontal center plane of the disc.

This type of pumping apparatus is known, for example, from British Pat. No. 1,064,007.

In the known pumping apparatus, the supply duct continues upward over one vertical side wall of the machine housing. At the upper end of the supply duct there are deflection means which conduct the supplied fluid to the higher level container.

There have been problems in designing such pumping apparatus in such a way that its through-put is satisfactory. In the known pumping apparatus, attempts have been made to achieve an adequate through-put by arranging a sheet metal ring laterally over the outer boundary of the spinning disc in such a way that an annular gap, which tapers in an outward direction, is located between the ring and the spinning disc.

In the known pumping apparatus it is necessary for the spinning disc to dip relatively deep down into the fluid collected in the sump. For this reason, the power absorbed by the spinning disc is relatively high.

A recommended field of application for pumping apparatus with spinning discs is in hydrodynamic adjustment couplings. There are couplings of the Foettinger design, with a variable filling level. For this purpose, in the revolving coupling shell, there are spraying nozzles, through which working fluid is continuously conducted away from the working chamber to the outside of the coupling. The working fluid collects in the sump of the coupling housing. It must be conducted from the sump into a higher level container from which the fluid can be supplied again to the working chamber of the coupling, via a control valve.

When the axis of rotation of such a hydrodynamic adjustment coupling is disposed horizontally, there is an opportunity to use a spinning disc as the pumping device for conducting the working fluid to the higher level container, since the disc can be attached to or formed on the revolving coupling shell. However, as already mentioned, the throughput of the spinning disc has not been satisfactory, and it has been found necessary to use other conventional pumps, such as rotary pumps or gear pumps, or to revert to the vertical arrangement of the axis of rotation of the coupling. In the latter vertical axis hydrodynamic adjustment coupling, it is possible to dispense with pumping apparatus. (See U.S. Pat. No. 3,999,385.)

SUMMARY OF THE INVENTION

An object of the present invention is to provide pumping apparatus of the spinning disc type which will produce a higher through-put, even with the smallest possible depth of immersion.

Another object of the present invention is to provide a pumping apparatus for working fluid, which efficiently raises the fluid from a sump to a container.

It is another object of the present invention to provide such a pumping apparatus wherein a spinning disc is used for such purpose.

It is a further object of the invention to provide such a pumping apparatus wherein the disc may have a generally horizontal spin axis.

According to the present invention, the pumping apparatus for working fluid includes a housing and includes a spinnable disc located in the housing. The disc is oriented vertically, having a horizontal axis. There is a sump at the bottom of the housing and the periphery of the disc moves through the sump. The periphery of the disc carries up working fluid from the sump. A duct surrounds a portion, and generally the lower portion, of the disc and directs the working fluid that may be flung off the disc back toward the disc. The exit of the duct may be generally in the vicinity of the horizontal center plane of the spinnable disc. Above the exit of the duct, the working fluid is carried around by the disc and may be flung off the disc toward the top of the housing. Deflection means at the top of the housing deflect the fluid flung off the spinnable disc into a container. The container delivers that fluid in measurable quantity back to the coupling working chamber.

Toward the bottom of the disc, the duct has an inwardly facing side that opens toward the periphery of the disc. Further, along the axial direction of the disc, the duct has a decreasing width measured in the spinning direction of the disc from the bottom toward the exit of the duct. In fact, the bottom of the duct may have 3 to 5 times the thickness of the disc, while the duct may be narrower in thickness than the width of the disc near the exit from the duct.

The disc includes means defined on its periphery for carrying the working fluid around. For example, the disc may have a peripheral groove defined in it and the peripheral groove may have a trapezoidal cross-section. The groove has lateral sides which are inclined toward each other and relative to the plane of spin of the disc, such that the cross-section of the groove widens outwardly toward the periphery of the disc. The lateral side walls may be inclined at 15° to the plane of spin of the disc.

The pumping apparatus is particularly useful in a hydrodynamic coupling, which comprises two separately rotatable coupling elements or shells, namely a drive element and a driven element, which communicate and transmit rotative force between them by means of a working fluid filled working chamber. The vertically oriented disc is connected with one of the drive or driven elements of the fluid coupling, and particularly with the drive element.

The container has a metered outlet communicating into the working fluid chamber in the coupling for delivering working fluid to that chamber. Exits from the working fluid chamber to the exterior of the coupling expel working fluid which settles back in the sump, whereby a closed cycle from the sump to the container to the coupling and back to the sump is provided.

By means of the invention, the following is achieved. Due to the fact that the supply duct terminates at or has its exit in the vicinity of the horizontal center plane of the spinning disc and the fluid conducted up to this point is turned back again into the annular groove on the spinning disc, the fluid is accelerated a sceond time. Also, the fluid now sprayed out by the spinning disc passes substantially along the so-called spraying-out plane or spin plane of the disc, without special components like guide ducts, or the like, and sprays into the upper area of the housing. The fluid is conducted to the elevated container by deflection means, preferably arranged in the roof of the housing. There is an important difference between the invention and the known pumping apparatus, of British Patent Specification No. 1,064,007, for example. It is not only the quantity of fluid leaving the vicinity of the spinning disc at one single point which is picked up and conducted further. Instead, the quantity of fluid sprayed out from a relatively large circumferential area of the spinning disc, lying above the axis of rotation, is picked up and conducted to the elevated container by the deflection means which extend transversely through the housing. In other words, a large angle of rotation of the spinning disc, generally exceeding 90°, provides the sprayed out fluid to the elevated container.

The through-put of the spinning disc pumping apparatus is significantly improved by this means. In this instance, it was found surprisingly that, due to the double acceleration of the conducted fluid, the spinning disc needed to dip only a few millimeters into the fluid collected in the sump. This is particularly advantageous when the working fluid is an oil, since the invention enables the previously experienced formation of froth and the heating of the oil to be eliminated to a very large extent.

Other objects and features of the invention will be apparent from the following description and accompanying drawings.

DESCRIPTION OF A PREFERRED EMBODIMENT

Figure 1:
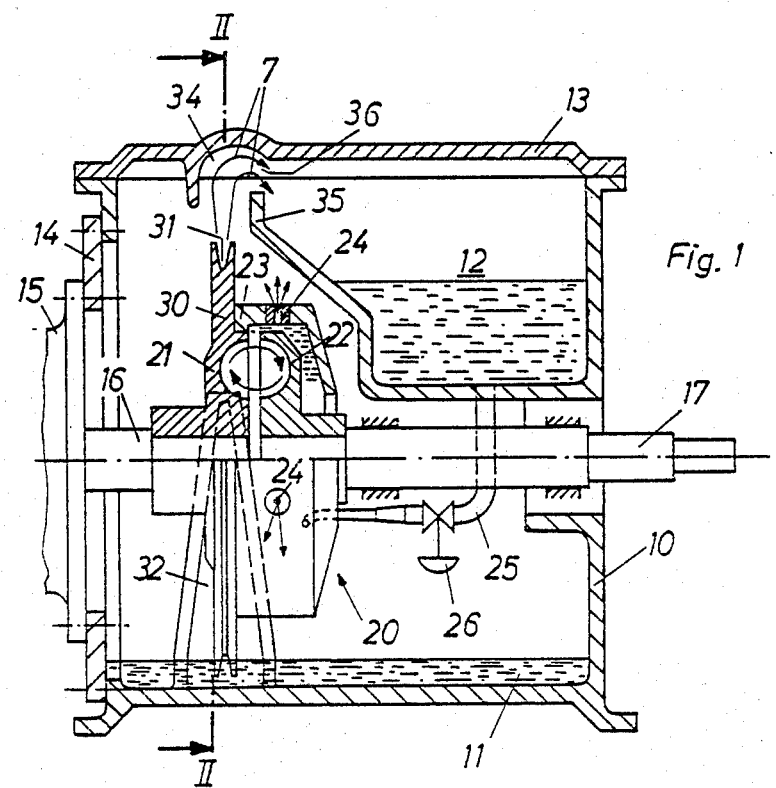
FIG. 1 is a longitudinal section through a hydrodynamic adjustment coupling with spinning disc pumping apparatus.
Figure 2:
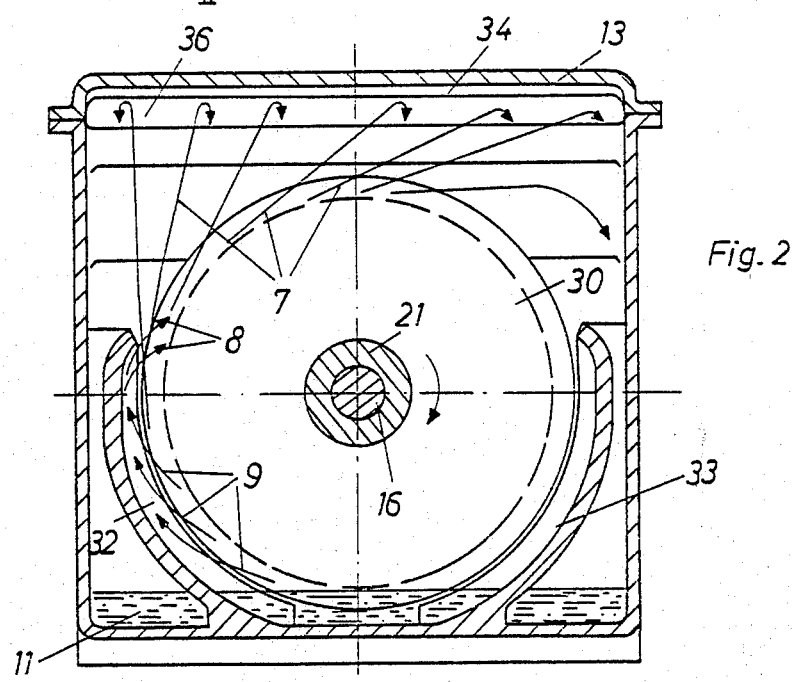
FIG. 2 is a cross-section along the line II—II of FIG. 1.

The present invention comprises a pumping apparatus which is used in a hydrodynamic adjustment coupling, although other applications and uses of the pumping apparatus of the invention may be envisioned. The illustrated coupling includes an enclosed housing 10. The bottom portion of the housing defines a sump 11 for working fluid, such as lubricating oil, or the like. Toward the top of the top of the housing, there is a working fluid container or reservoir 12 which is defined just beneath the roof 13 of the housing.

A drive motor 15 is connected through the intermediate flange 14 with the adjacent side wall of the housing 10. The motor drive shaft 16 is connected with the below described spinnable disc 30, which disc defines and is part of the first of the two coupling elements or shells of the hydrodynamic coupling. There is a drive take off shaft 17 which is connected to the other coupling element or shell of the hydrodynamic coupling 20. There is a primary bucket wheel 21 which is fixed on the motor shaft in the working chamber. There is a secondary bucket wheel 22 which is fixed on the drive take off shaft 17 in the same working chamber. The working fluid in the working chamber containing the primary and secondary bucket wheels transmits the torque of the primary bucket wheel to the secondary bucket wheel and the level of working fluid in the working chamber determines the speed and torque of the driven shaft 17.

The coupling shell 23 attached to the primary bucket wheel 21 positions the primary bucket wheel and the disc 30 with respect to the driven shaft 17 and also encloses and defines the working chamber for the working fluid. The coupling shell 23 has spray nozzles 24 defined at spaced intervals around it. As the primary bucket wheel rotates, some of the working fluid in the working chamber exits through the nozzles 24 and from there it simply falls into the sump 11 to be reused.

There is a working chamber filling line 25 which leads from the container 12 into the interior of the coupling shell 23 for feeding working fluid to the working chamber. The control valve 26 meters the flow of working fluid, in order to assure the desired speed and torque of the driven shaft 17, as is known in the art.

A spinning disc 30 is formed on and spins with the primary coupling shell. The height of the fluid in the sump 11 is determined, the diameter of the disc 30 is selected and the position of the horizontally oriented spin axis 16 of the disc 30 is so determined that the disc 30 dips only a slight distance into the sump 11, that is only a small portion of the periphery thereof at the bottom of the housing dips into the fluid in the sump 11. The disc 30 has an annular peripheral groove 31 defined in it which is trapezoidal in cross-section, widening from the inside of the groove toward the outside thereof. The lateral side walls of the groove are both inclined toward each other and with respect to the plane through which the disc 30 spins at a preferred angle of at most 15°.

There is a first supply duct 32 supported in the housing at one lower quadrant of the disc 30. The duct encloses approximately 90° of the circumference of the spinning disc 30, starting at the bottom of the disc with respect to the housing and terminating at the top end thereof, generally at the horizontal center plane of the spinning disc. The duct is positioned downstream of the bottom of the disc in the spin direction thereof. The supply duct 32 is generally a hollow which opens on the side thereof toward the periphery of the disc. The duct generally follows the profile of the portion of the disc it passes around and is spaced away therefrom. Toward the upper terminal end of the duct, the duct closes in toward the disc, whereby working fluid that impinges upon the interior wall of the duct is generally directed back toward the periphery of the disc to be carried out of the duct by the spinning disc.

A second symmetric supply duct 33 is provided at the other lower quadrant of the disc, for performing the same purpose as the duct 32 in the event that the disc 30 is rotated in the opposite direction.

The working fluid sprayed off the periphery of the disc should enter the container 12. For this purpose, deflection means comprising a curved deflector trough 34 are defined at the top of the housing above the disc 31. The deflector 34 extends across the whole width of the housing transverse to the direction of the spin axis 16 of the disc, whereby as working fluid is sprayed up by centrifugal force from the periphery of the disc, it impinges upon the deflector 34. The deflector is, therefore, generally in the plane of spin of the disc 30. The deflector deflects the working fluid under the top wall 13 of the housing, over the adjacent high side wall 35 of the container 12 and through the narrow inlet gap 36 into the container 12, whereby the working fluid may be redirected out of the container, back into the working chamber and then back into the sump, completing the flow cycle.

The above described pumping apparatus operates as follows:

Fluid, i.e. liquid, is picked up and carried along by the revolving spinning disc 30 when it dips into the sump 11. Some of the fluid is flung up into the supply duct 32 as shown by arrows 9. The supply duct 32, which becomes increasingly narrow axially towards the top of the duct, deflects the fluid transported upward back into the annular groove 31 of the disc 30 arrows 8. The fluid is accelerated a second time in the groove 31 by the spinning disc 30 and the fluid is flung upward in different directions, but predominantly within the spraying-out plane shown by arrows 7. The major portion of the fluid which is spun out into the deflector trough 34 is conducted through the inlet gap 36 over the wall 35 into the elevated container 12. From the container 12, the working fluid passes in metered amounts through control valve 26 and via the filling line 25 into the interior of the hydrodymanic coupling 10. A certain amount of the fluid is sprayed continuously out through the nozzles 24 of the coupling 10. Thus, assuming a constant rotary speed for the engine, a specific rotary speed is set for the drive take-off shaft 17, according to the filling level of the coupling.

Another important feature of the invention arises from the fact that the fluid spun off upward by the spinning disc 30 is deflected by the deflection trough 34 in such a way that a component of the flow direction is produced which runs parallel to the axis of rotation of the coupling. This is another difference compared with the known construction described in British Patent Specification No. 1,064,007.

The present invention may be embodied in other specific forms without departing from the spirit or essential attributes thereof, and, accordingly, reference should be made to the appended claims, rather than to the foregoing specification, as indicating the scope of the invention.

What is claimed is:

1. Pump apparatus for pumping a working fluid, in a hydrodynamic coupling, or the like, the pumping apparatus comprising:
    a housing having a sump therein for the fluid; a container for the fluid, the container having an entrance into it which entrance is located above the level of fluid in the sump;
    a spinnable disc in the housing, spinning in a plane which is substantially vertical; means for spinning the disc in the housing around a spin axis; the disc having a periphery; the disc being so shaped and the spin axis thereof being so placed that the disc periphery will dip into the liquid in the sump as the disc spins;
    a stationary supply duct in the housing, the duct shaped and placed to enclose a portion of the periphery of the disc, starting from the bottom of the disc with respect to the housing and extending around the disc in the direction of spin of the disc to an exit end of the duct; wherein the duct has a side thereof facing radially inwardly toward the disc, the duct being in spaced apart relation to the disc, and the side of the duct curving toward the disc at an exit of the duct, whereby the duct is shaped and placed for directing fluid, which would otherwise be thrown clear of the disc back toward the periphery of the disc, at least at the exit end of the duct;
    the disc including fluid carrying means at the periphery thereof for carrying fluid up beyond the exit from the duct for throwing upwardly the fluid carried by the fluid carrying means and for flinging the fluid to enter the container through the entrance thereof.

2. The pumping apparatus of claim 1, further comprising fluid deflection means in the housing, which are placed and shaped for being impinged upon by fluid thrown off the disc periphery and up beyond the exit from the duct, and the deflection means being for deflecting the fluid which impinges upon the deflection means into the container entrance.

3. The pumping apparatus of claim 2, wherein the deflection means extends along the housing, along a path transverse to the disc spin axis and in the spraying out plane of the fluid off the disc, for enabling the deflection means to be impinged upon by the fluid thrown up by the disc from around a substantial portion of the periphery of the disc.

4. The pumping apparatus of claim 1, wherein the duct encloses approximately one quarter of the periphery of the disc.

5. The pumping apparatus of either of claims 1 or 4, further comprising a second one of the ducts, placed to enclose a second portion of the periphery of the disc, starting from the portion of the disc that is at the bottom thereof with respect to the housing and extending around the disc in the opposite direction from the first mentioned duct.

6. The pumping apparatus of claim 4, wherein the duct has a side thereof facing radially inwardly toward the disc that extends around the circumference of the disc and is open in a direction toward the fluid carrying means on the disc.

7. The pumping apparatus of claim 6, wherein the fluid carrying means on the disc comprises an annular groove having an opening in a radially outward direction in the periphery of the disc; the groove being for transporting fluid therein.

8. The pumping apparatus of claim 7, wherein the annular groove is defined between lateral surfaces formed in the disc, and the lateral surfaces are inclined toward each other and relative to the plane of spin of the disc, such that the cross-section of the groove widens to the outside.

9. The pumping apparatus of claim 7, wherein the duct has a clear width dimension, measured in a direction along the spin axis of the disc, which dimension tapers narrower from the bottom of the disc with respect to the housing toward the exit from the duct.

10. The apparatus of any one of claims 4, 6 or 9, wherein the duct exit is in the vicinity of the generally horizontal center plane of the disc.

11. The pumping apparatus of either one of claims 1 or 4, wherein the duct exit is in the vicinity of the generally horizontal center plane of the disc.

12. The pumping apparatus of claim 1, wherein the duct has a side thereof facing radially inwardly towards the disc that extends around the circumference of the disc and is open in a direction toward the fluid carrying means on the disc.

13. The pumping apparatus of claim 12, wherein the fluid carrying means on the disc comprises an annular groove having an opening in a radially outward direction in the periphery of the disc; the groove being for transporting fluid therein.

14. The pumping apparatus of claim 12, wherein the duct has a clear width dimension, measured in a direction along the spin axis of the disc, which dimension tapers narrower from the bottom of the disc with respect to the housing toward the exit from the duct.

15. The pumping apparatus of claim 1, wherein the fluid carrying means on the disc comprises an annular groove having an opening in a radially outward direction in the periphery of the disc; the groove being for transporting fluid therein.

16. The pumping apparatus of claim 15, wherein the duct has a clear width dimension, measured along the axis of the disc which dimension tapers narrower from the bottom of the disc with respect to the housing toward the exit from the duct.

17. The pumping apparatus of either one of claims 14 or 16, wherein the clear width dimension of the duct is in the range of 3 to 5 times the thickness of the disc near the bottom thereof with respect to the housing and the width dimension is less than the thickness of the disc near the top exit of the duct.

18. The pumping apparatus of claim 15, wherein the annular groove is defined between lateral surfaces formed in the disc, and the lateral surfaces are inclined toward each other and relative to the plane of spin of the disc, such that the cross-section of the groove widens to the outside.

19. The pumping apparatus of claim 18, wherein the annular groove has a cross-section that is trapezoidal in shape.

20. The pumping apparatus of claim 19, wherein each lateral surface is inclined relative to the plane of spin of the disc at at most 15°.

21. The pumping apparatus of either one of claims 1 or 2, further comprising means for transmitting fluid from the container and back into the sump at a controllable rate.

22. The pumping apparatus of claim 21, including hydrodynamic coupling means; the coupling means including a first coupling element; the disc being a part of the first coupling element; a second coupling element; the first and second coupling elements together defining a working chamber in which working fluid is to be replaced; the container communicating with the working chamber for delivery of working fluid thereto and the working chamber having an outlet therefrom for the working fluid, the outlet delivering the working fluid to the exterior of the coupling and so that the working fluid may settle into the sump.

23. Pump apparatus for pumping a working fluid, in a hydrodynamic coupling, or the like, the pumping apparatus comprising:

a housing having a sump therein for the fluid; a container for the fluid, the container having an entrance into it which entrance is located above the level of fluid in the sump;

a spinnable disc in the housing, spinning in a plane which is substantially vertical; means for spinning the disc in the housing around a spin axis; the disc having a periphery; the disc being so shaped and the spin axis thereof being so placed that the disc periphery will dip into the liquid in the sump as the disc spins;

a stationary supply duct in the housing, the duct shaped and placed to enclose a portion of the periphery of the disc, starting from the bottom of the disc with respect to the housing and extending around the disc in the direction of spin of the disc to an exit end of the duct; the duct being shaped and placed for directing fluid back toward the periphery of the disc, at least at the exit end of the duct;

the disc including fluid carrying means at the periphery thereof for carrying fluid up beyond the exit from the duct for throwing upwardly the fluid carried by the fluid carrying means and for flinging the fluid in a plane to enter the container through the entrance thereof; and fluid deflection means in the housing, which are placed and shaped for being impinged upon by fluid thrown off the disc periphery from around a substantial portion thereof and up beyond the exit from the duct; the deflection means extending along the housing, along a path transverse to the disc spin axis and in the plane in which the fluid is sprayed off the disc.

24. The pumping apparatus of claim 1, 3, or 23, in which the disc extends only a few millimeters into the fluid contained in the sump when the disc is spinning.

25. The pumping apparatus of claim 1, 3, or 23 in which the fluid is accelerated a second time by the disc when directed back toward the periphery thereof.

26. The pumping apparatus of claim 1, 3, or 23 in which the duct extends to a point below an uppermost portion of the disc leaving an unenclosed portion of the disc from which fluid can be thrown into an open region within said housing above said disc, thereby being thrown into the entrance of the container.

* * * * *